(12) United States Patent
Lang et al.

(10) Patent No.: US 8,601,135 B2
(45) Date of Patent: Dec. 3, 2013

(54) SUPPORTING WPS SESSIONS USING TCP-BASED CONNECTIONS

(75) Inventors: Joshua Lang, Seattle, WA (US); Craig Hobbs, Seattle, WA (US); Steve Kelly, Redmond, WA (US); John-Anthony Owens, Seattle, WA (US)

(73) Assignee: CISCO Technology, Inc., San Jose, CA (US)

( * ) Notice: Subject to any disclaimer, the term of this patent is extended or adjusted under 35 U.S.C. 154(b) by 40 days.

(21) Appl. No.: 13/342,754

(22) Filed: Jan. 3, 2012

(65) Prior Publication Data
US 2013/0173702 A1 Jul. 4, 2013

(51) Int. Cl.
*G06F 15/16* (2006.01)
(52) U.S. Cl.
USPC .......................... 709/227; 370/330; 455/436
(58) Field of Classification Search
USPC .................. 709/200–203, 217–227; 370/330; 455/436
See application file for complete search history.

(56) References Cited

U.S. PATENT DOCUMENTS

| | | | |
|---|---|---|---|
| 7,295,524 B1* | 11/2007 | Gray et al. | 370/254 |
| 7,356,011 B1* | 4/2008 | Waters et al. | 370/338 |
| 7,535,880 B1* | 5/2009 | Hinman et al. | 370/338 |
| 7,792,538 B2* | 9/2010 | Kozisek | 455/507 |
| 7,793,339 B2* | 9/2010 | Lagnado | 726/4 |
| 7,920,531 B2* | 4/2011 | Gupta et al. | 370/338 |
| 8,068,450 B2* | 11/2011 | Kozisek | 370/328 |
| 8,254,915 B2* | 8/2012 | Kozisek | 455/432.1 |
| 8,340,065 B2* | 12/2012 | Gupta et al. | 370/338 |
| 2007/0091861 A1* | 4/2007 | Gupta et al. | 370/338 |
| 2008/0259815 A1* | 10/2008 | Gorman | 370/254 |
| 2008/0262974 A1* | 10/2008 | Kozisek | 705/77 |
| 2008/0262975 A1* | 10/2008 | Kozisek | 705/77 |
| 2011/0149937 A1* | 6/2011 | Gupta et al. | 370/338 |
| 2012/0287897 A1* | 11/2012 | Kozisek | 370/329 |
| 2013/0103939 A1* | 4/2013 | Radpour | 713/152 |

* cited by examiner

*Primary Examiner* — Moustafa M Meky
(74) *Attorney, Agent, or Firm* — Patterson & Sheridan LLP

(57) ABSTRACT

Techniques are disclosed for a client application on a computing device to perform a configuration process with a wireless access point. The access point exposes an isolated, unsecured Access Point which provides access to the DHCP services and services by which a client application can run the WPS registration process over a TCP (or higher layer protocol) connection.

24 Claims, 6 Drawing Sheets

SUPPORTING WPS SESSIONS USING TCP-BASED CONNECTIONS

TECHNICAL FIELD

Embodiments presented herein generally relate to secure wireless networks. More specifically, embodiments presented herein provide techniques for supporting the Wifi Protected Setup (WPS) protocol using TCP-based sessions.

BACKGROUND

Wireless networks have become commonplace. For example, wireless access points are used in both home and enterprise environments to provide an internet connection to a variety of Transport Control Protocol/Internet Protocol (TCP/IP) enabled devices. The access points typically operate using a version of the IEEE 802.11 wireless local area network protocol (e.g., the 802.11a, b, g or n versions of this protocol). Desktop PCs, laptop PCs, mobile telephones, Voice over IP (VoIP) telephones, tablets, net-books, video game consoles, digital video recorders, DVD players, video streaming systems, among other devices, can connect to wireless networks operating according to these standards.

To join a network, a host station typically needs to identify a service set identifier (SSID) broadcast by an access point and then perform a process defined by the 802.11 protocol to join the wireless network represented by that SSID. In some cases, the host station may need to authenticate itself to join a wireless network as part of this process. For example, to provide security, a wireless network may comply with established security standards such as WPA (Wifi Protected Access) or its predecessor WEP (wired equivalent privacy). In such cases, a device may authenticate itself to the wireless network by providing a password or key along with a service set identifier (SSID). Additionally, Wifi protected setup (WPS) provides a protocol that simplifies the process for users to create a connection between a wireless access point and a Wifi-enabled device.

BRIEF DESCRIPTION OF THE DRAWINGS

So that the manner in which the features the embodiments presented herein can be understood in detail, a more particular description may be had by reference to example embodiments, some of which are illustrated in the appended drawings. It is to be noted, however, that the appended drawings illustrate only example embodiments and are therefore not to be considered limiting of its scope.

DESCRIPTION OF EXAMPLE EMBODIMENTS

Overview

Figure 1:
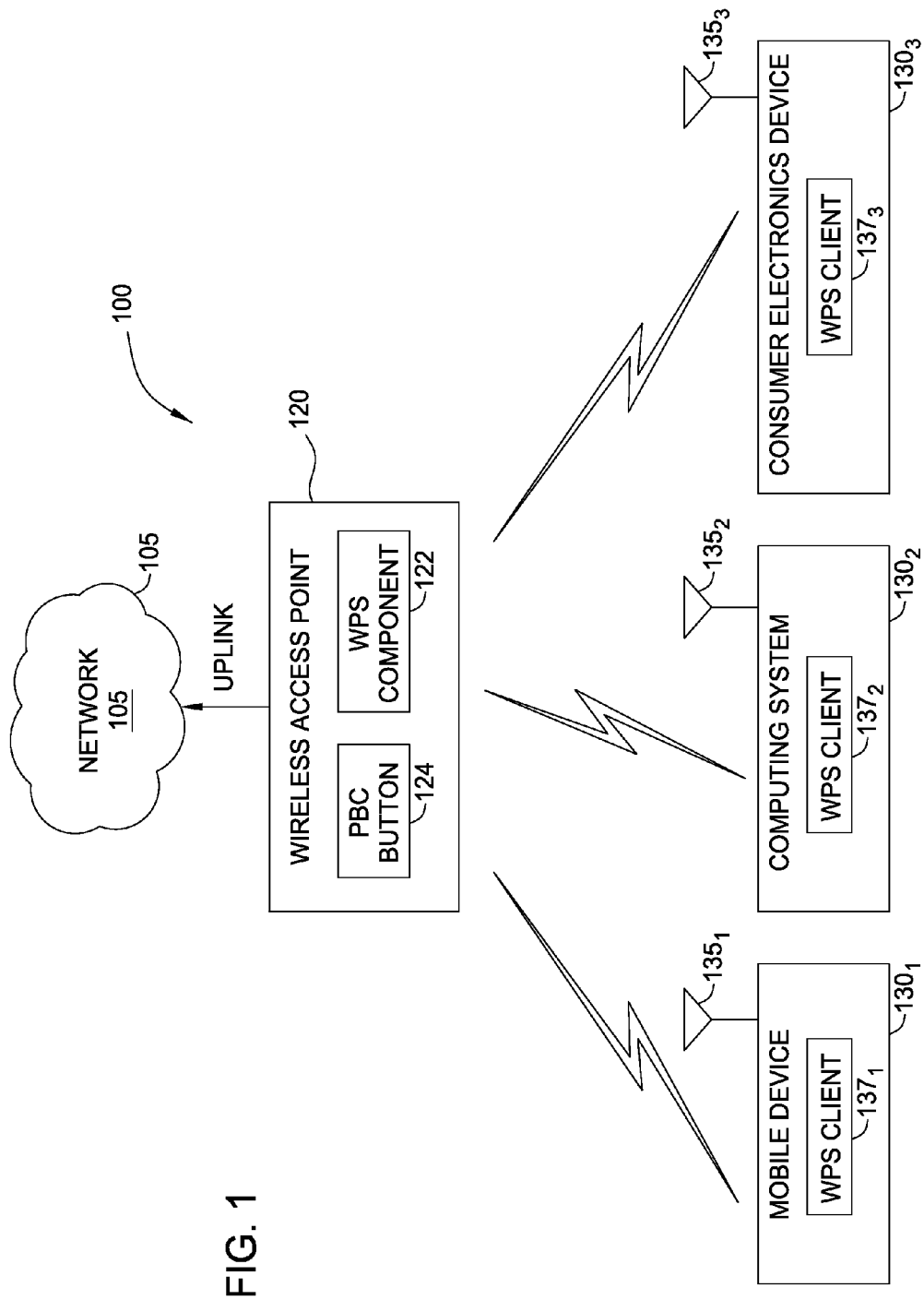
FIG. 1 illustrates an example computing environment which includes a wireless access point and client system configured to support WPS configuration sessions using TCP-based connections, according to one embodiment presented in this disclosure.

Embodiments presented herein allow client devices to use wifi protected setup techniques (e.g. push button configuration (PBC), personal identification number (PIN), or password) to associate with a wireless network. One embodiment includes a method. This method may generally include exposing, on a wireless access point, a first wireless network used to configure client devices to access a second wireless network configured on the wireless access point and establishing a network connection with a client application on a client device over the first wireless network. This method may also include receiving, over the network connection, by the wireless access point, one or more network messages generated by the client application and also include sending, over the network connection, to the client application, a set of credentials used to join the second wireless network.

Another embodiment includes a method. This method may generally include establishing a network connection with a first wireless network on by wireless access point, generating one or more Wifi protected setup (WPS) messages, sending, over the network connection, the WPS messages to the wireless access point, and receiving, over the network connection, from the wireless access point a set of credentials needed to access a second wireless network on the wireless access point.

Other embodiments include, without limitation, a computer-readable medium that includes instructions that enable a processing unit to implement one or more aspects of the disclosed methods as well as a system configured to implement aspects of the disclosed methods.

Example Embodiments

A wireless network may be configured to allow only authenticated devices to join the network. However, configuring and securing a wireless network can be cumbersome. Further, wireless networks are often setup by people with little expertise in networking or network security. Consequently, many wireless networks are operated with little or no security features enabled. To address this, Wifi Protected Setup (WPS) has been developed as an open standard to provide an easy, reliable approach for configuring a secure wireless network.

Among other things, the WPS standard provides a mechanism and protocol specification for push button configuration (PBC) for consumer equipment vendors to use, if they chose to do so. The WPS standard describes behavior of access points which support a PBC mechanism. PBC allows a user to associate a client device with a wireless network by simply pushing a button, either an actual button or a virtual one, on both the access point and the wireless client device. Another approach specified by the WPS standard is a PIN-based registration of new client devices. Using this approach, a PIN is specified for an access point and may be printed on a product label or viewed on a utility screen. The PIN is entered in the setup application for the wireless device that wants to join the network. Note the PIN and PBC approaches are roughly equivalent. Pushing the button performs the same function as entering the PIN—in both cases, doing so activates a host configuration mode, where new devices may enroll in a wireless network during a limited configuration period.

Once the button on the client is pressed (whether a physical button on the device or a graphical button on a display screens) or once the PIN is entered, the client begins broadcasting a message requesting to enroll in any PBC-capable wireless networks within range. Similarly, once the button on the access point is pressed, the access point begins advertising messages indicating that client devices may enroll with that access point. Note, the order in which the buttons are pressed does not matter, but once the button is pushed on the access point, the user has a limited window (120 seconds in WPS) in which to push the button on the wireless client device to associate it with the wireless network.

Provided the respective buttons are pressed within the time window, the access point enrolls the client as an authenticated device within that wireless network. Thereafter, the client device may join the wireless network without needing to press the configuration button again. That is, the push button registration process occurs once and the network will subsequently recognize the client device as being authorized to join the wireless network. Additionally, encryption keys may be generated and exchanged to secure wireless communications between the device and the access point each time the device joins the network.

For a client application to enroll a new device in a wireless network using WPS generally requires that a client device executing the application provide support for the 802.1x and Extensible Authentication Protocol (EAP) protocols for the PIN or push-button based setup approaches—as the WPS registration process depends on messages exchanged using these protocols. However, many platforms do not readily provide application support for these protocols, e.g., either by exposing APIs which implement the required protocols directly or supporting a user-defined implementation of the protocols. Due to this limitation, it is at best very complex, and frequently impossible, to implement a WPS client application on these platforms, limiting the range of devices that can join a network using the WPS PIN or push-button registration processes.

At the same time, network enabled devices frequently support APIs which allow for client-managed TCP connections and typically support higher level protocols built on top of TCP, such as Hypertext Transfer Protocol (HTTP), Simple Object Access Protocol (SOAP) and (Universal Plug and Play) UPnP. Embodiments presented herein use a TCP connection (or connections established using higher layer protocols such as HTTP) to encapsulate messages exchanged during the WPS registration process. An application on the access point passes the encapsulated messages to the WPS registration process—as well as transmits messages to a client application performing the registration process on the client device. Doing so allows a client device to retrieve the Wireless Local Area Network (WLAN) credentials and connect in much the same fashion as would a typical client.

In one embodiment, e.g., the access point exposes a Virtual Access Point (VAP) which provides DHCP-assigned addresses and supports a TCP-based service for running the WPS Registration Protocol. That is, this VAP provides a wireless network with access limited to performing the WPS registration process. For example, the VAP may be enabled after a user presses the configuration button (or enters the PIN using a management interface). Further, this VAP may be active for a limited period of time after the user presses the PBC button. The VAP need not require any authentication or encryption and allow connections from any client, much the same way an access point which supports WPS allows clients to associate to the wireless access point using a physical push button configuration process. Once connected to this VAP the client may obtain an IP address using DHCP. Once configured with an IP address, the client application may then open a TCP connection to a service on the VAP and complete the WPS Registration Protocol over an implementation-defined protocol, such as UPnP. The WPS registration protocol allows the client device to obtain a set of WLAN credentials (e.g., an SSID and password) for connecting to a primary network exposed on the wireless access point.

Note, the following description uses the push button configuration features of the WiFi Protected Setup standard as an example of PBC based association and authentication for network infrastructures that include multiple access points. However, one of ordinary skill in the art will recognize that embodiments presented in this disclosure can be generally applicable and extensible to other wireless networking protocols or network infrastructures which support push button configuration features. That is, the techniques presented herein may be adapted for use with other WiFi protected setup processes where an enrollee is authenticated and enrolled without any knowledge of any pre-shared secret.

FIG. 1 illustrates an example computing environment 100 which includes a wireless access point and client system configured to support WPS configuration sessions using TCP-based connections, according to one embodiment presented in this disclosure. As shown, the computing environment 100 includes a wireless access point 120 which provides an uplink to a network 105 (e.g., the internet) for a plurality of wireless clients. In one embodiment, the wireless access point 120 exposes one or more wireless networks to client devices. That is, once a wireless network is configured, the access point 120 exposes it to clients, allowing clients to associate themselves with that network. In context of the present disclosure, the access point may expose one or more configured wireless networks, as well as one special purpose VAP used to perform WPS device registration process.

Illustratively, three such clients $130_{1-3}$ have established a connection to a wireless network exposed on by the access point 120—a mobile device $130_1$, a computing system $130_2$, and a consumer electronics device $130_3$. The client devices $130_{1-3}$ each include a transceiver and antenna $135_{1-3}$ used to exchange modulated RF signals with the access point 120.

Mobile device 130 is included to be representative of a variety of handheld computing devices such as a mobile telephone or "Smartphone," handheld computing tablet, video game and a digital music/video players, etc. As shown, the mobile device $130_1$ includes a transceiver and antenna $135_1$ used to send/receive signals from the wireless access point 120 and a WPS client $137_1$.

In one embodiment, the WPS client $137_1$ is configured to perform a push button registration process to obtain a set of WLAN credentials needed to access a primary or secure wireless network. For example, after a user pushes the PBC button 124 on the access point 120, a registration window begins, i.e., limited period of time where new devices may obtain credentials used to access a secure network hosted by the access point 120. As part of the registration window, the wireless access point may activate a limited access wireless network used to perform the WPS registration process with a client device. Within the registration window, the user launches the WPS client $137_1$, which communicates over the limited-access wireless network to obtain an IP address. Once obtained, the WPS client $137_1$ may perform the WPS registration process with the access point over a TCP (or higher layer protocol), as supported by the mobile device $130_1$. Importantly, the WPS client $137_1$ may exchange TCP (or HTTP) messages between the WPS client $137_1$ and a WPS registration component 122 on the access point 120, replacing the need for the WPS client $137_1$ to send and receive EAP messages using 802.1x directly.

In one embodiment, the WPS client $137_1$ receives credentials used to access the secure network hosted by the access point 120. Such credentials may include an SSID and password for accessing the secure network, as well as encryption keys, certificates or any other suitable credentials. Further, once received by the mobile device 130, the WPS client $137_1$ may update a network profile on the mobile device $130_1$ with the received credentials. Doing so allows the mobile device $130_1$ to subsequently join the secure network hosted by the access point 120 without having to perform the registration process again. However, some devices may not support changes to a network profile being made by user-level client applications. In such a case, the WPS client $137_1$ may display the credentials received during the registration process on a display screen. Doing so allows the user of such a device to manually update or add a network profile on the mobile device $130_1$ with the credentials used to access the secure network.

Computing system $130_2$ is included to be representative of a desktop or laptop computer. Accordingly, computing system $130_2$ may include a processor, memory, and storage device, along with the appropriate computing peripherals (e.g., a network interface, display, keyboard, mouse, etc.). The computing system $130_2$ may execute a WPS client $137_2$ to engage in the registration process with the WPS component 122 on the access point 120. Like the WPS client $137_1$ on the mobile device $130_1$, the WPS client $137_2$ may encapsulate lower layer protocol messages (e.g., EAP messages) in TCP messages exchanged between the WPS client $137_2$ and a WPS registration component 122 on the access point 120.

Similarly, the WPS client $137_3$ on consumer electronics device $130_3$ may be executed to engage in the registration process with the WPS registration component 122 on the access point 120. Importantly, in each case, the low level messages specified by the WPS protocol exchanged between the WPS clients $130_{1-3}$ and the WPS component 122 may be encapsulated in a TCP (or higher) layer protocol, allowing the WPS registration process to be performed without requiring the client application $130_{1-3}$ access (or implement) the lower layer protocols (e.g., EAP) directly. Instead, the EAP messages are carried over the limited access wireless network encapsulated in higher layer protocols (e.g., TCP/HTTP).

Figure 2:
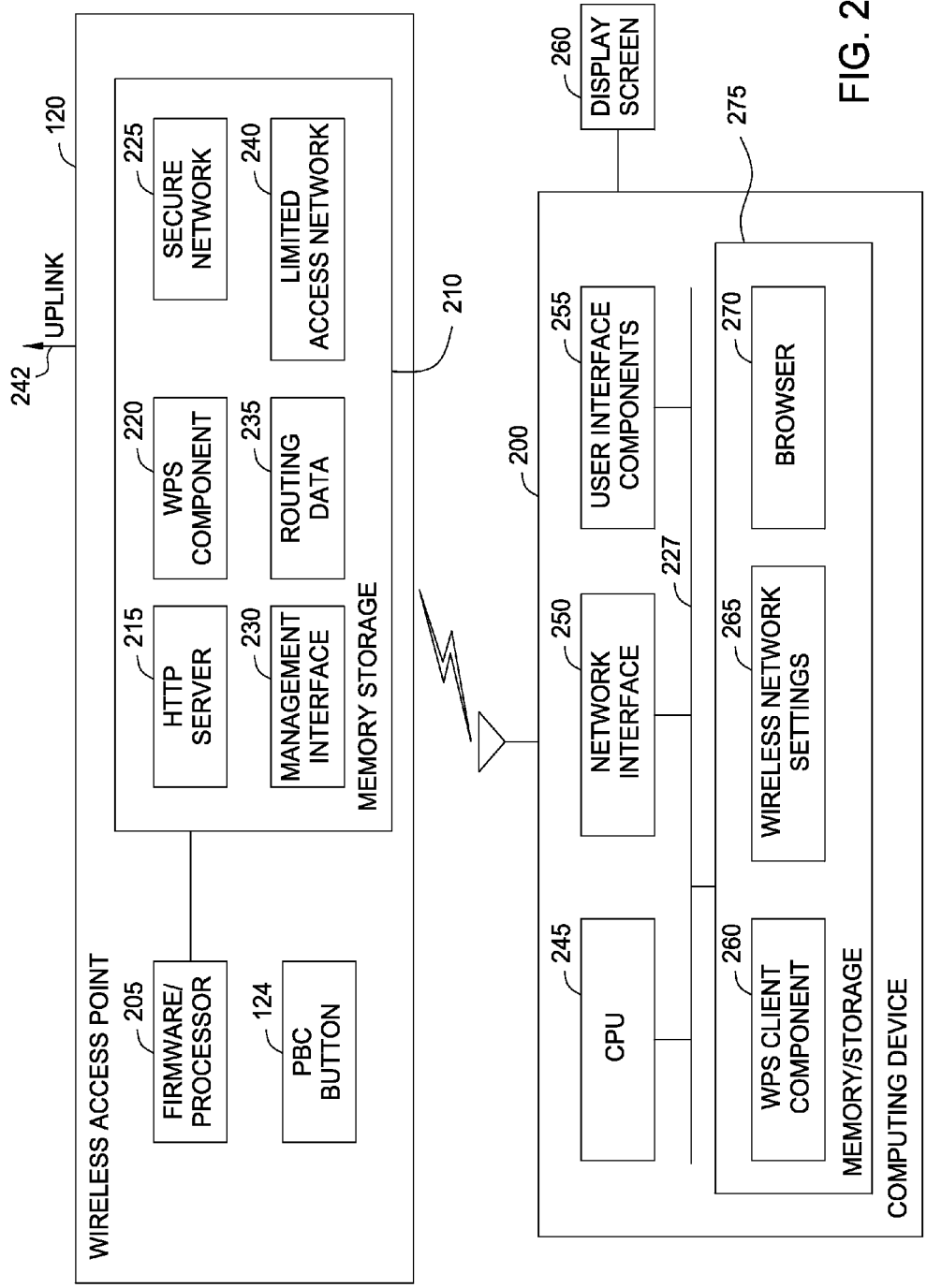
FIG. 2 further illustrates the wireless access point first illustrated in FIG. 1, according to one embodiment presented in this disclosure.

FIG. 2 further illustrates the wireless access point 120 first illustrated in FIG. 1, according to one embodiment presented in this disclosure. As shown, the access point 120 includes a firmware/processor 205, a PBC button 124, and a memory/storage 210. The firmware component/processor 205 provides the executable logic of the access point 120, and the memory/storage 210 stores application data and configuration settings used by the access point 120. The firmware component/processor 205 may include an application specific integrated circuit, FPGA, or other processing device, e.g., a CPU having one or more processing cores, etc. Memory 224 may include any combination of volatile and non-volatile memory storage elements, including DRAM, flash memory, solid state storage devices (SSD), or magnetic disk drives, etc.

Illustratively, the memory 210 includes an HTTP server 215, a WPS component 220, a configuration for a secure network 225, a management interface 230, routing data 235, and a configuration for a limited access network 240.

In one embodiment, the PBC button 124 is a physical component of the access point device 120. In such a case, the user presses the PBC button 124 to initiate the PBC configuration process, i.e., the user presses the PBC button 124 to grant client devices access to the secure network 225. While not required, the smart network host device could present an indication that it has entered a push button configuration mode. For example, an LED could be configured to flash for one hundred and twenty seconds following the point in time where the user pushes the PBC button 124.

The management interface 230 provides a network-accessible interface used to configure the access point 120. For example, a client device with access to the secure network 225 may browse to an IP address of the access point 120. In response, http server 215 may serve a web application configured to expose the management interface 230 to a user. The management interface 230 could be used, e.g., to set firewall rules, access restrictions, DHCP settings, port forwarding settings, etc. Routing data 235 corresponds to information used by the access point to forward traffic to/from a network accessed over uplink 242 and the secure network 225; namely, traffic for one or more devices connected to the secure network.

Once a user presses the PBC button 124 (or presses a virtual button accessed using the HTTP server 315 and management interface 230) or after the user enters a PIN number over the management interface 230, the access point 120 may enter a configuration or registration mode. That is, the access point 120 enters a configuration mode in order to provide client devices with credentials for accessing the secure network 225. In one embodiment, the access point 120 enables the limited access network 220 and waits for new clients to join that network. Once this occurs, the WPS component 220 may receive (and send) registration messages associated with the WPS enrollment process encapsulated in TCP (or higher layer protocol) messages. Doing so allows a client application on computing device 200 which cannot generate/send lower layer protocol messages (e.g., EAP messages) to the access point 120 directly.

FIG. 2 also illustrates a computing device 200 with a WPS client component 260 executed to perform the WPS registration process with the access point 120. As shown, the computing device 200 includes a CPU 245, a network interface 250, a user interface component 255, and a memory/storage 275 connected by a bus 227. The CPU 245 provides a processing unit configured to execute applications stored in the memory 275 and may include a CPU having one or more processing cores, etc. Memory 275 may include any combination of volatile and non-volatile memory storage elements, including DRAM, flash memory, SSD storage, or magnetic disk drives, etc. The network interface 250 provides a transceiver configured to send and receive RF signals to and from the access point 120.

User interface components 255 are included to be representative of a variety of input components and may include any collection of buttons, switches, graphical images, etc. Interface components 255 may also include external devices (e.g., a keyboard and mouse connected via a Bluetooth® connection). Further, the display screen 260 may provide a touch sensitive surface used to present an interactive graphical interface to users.

Illustratively, the memory 275 includes the WPS client component 260, wireless network settings 265, and a browser application 270. As noted, once the user has activated a registration window (e.g., by pushing button 124), the WPS client component 260 may establish a TCP (or higher layer) protocol connection with the WPS component 220 on the access point 220 over the limited access network 240. Such a connection may then be used to encapsulate lower layer messages sent to the WPS component 220 in order to complete the registration process.

Once complete, the WPS component 220 provides the computing device 200 with a set of credentials used to access the secure network 225. In one embodiment, the WPS component 260 may itself update the wireless network settings using the credentials. For example, the WPS client component 260 may store an SSID, password, and any encryption and/or authentication keys used to access the secure network. Alternatively, the WPS client component 260 may display the credentials to the user. Doing so allows the user to create a network profile on the computing device 200 using the supplied credentials. This latter approach may be useful for enrolling devices with the access point 120 in cases where the device does not allow a user application to modify certain device settings. That is, on devices where the client application cannot modify the wireless network settings 265 directly.

Figure 3:
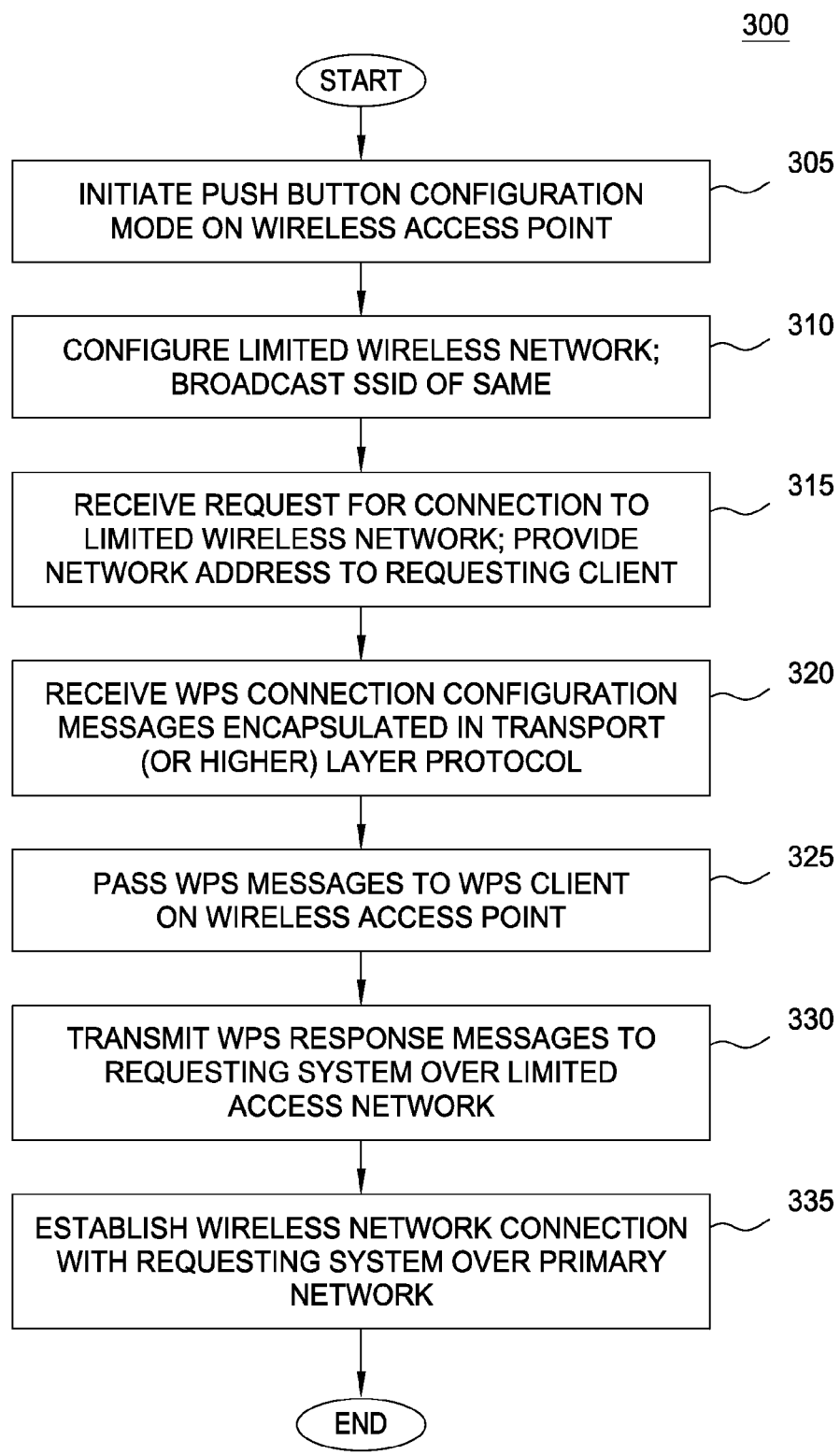
FIG. 3 illustrates a method for a wireless access point to enroll a client device using push button configuration using TCP-based connections, according to an example embodiment presented in this disclosure.

FIG. 3 illustrates a method 300 for a wireless access point to enroll a client device using push button configuration using TCP-based connections, according to an example embodiment presented in this disclosure. As shown, the method 300 begins at step 305 where a user initiates a push button configuration mode on a wireless access point. As noted, a user may press a PBC button on the access point. Alternatively, a user could click on a virtual button using a device already configured to access the secure network of the access point. In such a case, the user could navigate a web browser to an IP address associated with a management interface on the access point and click on button rendered in a browser. Such an interface could also be used to enter a PIN code use to initiate the enrollment period.

However initiated, at step 310, the access point may expose an unsecured, limited access network on the access point. Note, such a virtual access point may be present along with the secure wireless network on the device. Once initiated, the access point may broadcast an SSID, allowing client devices to join the limited access network and exchange network messages with the WPS configuration component on the access point. Accordingly, at step 315, the access point receives a request from a client device to join the limited access network. And in response, the access point provides a network address to the requesting client.

At step 320, once the device joins the wireless network, the access point may receive WPS registration messages encapsulated over the transport (or higher) layer protocols using the limited access network. At step 325, the access point retrieves the encapsulated messages (e.g., the underlying EAP messages) are passed to the WPS registration component on the access point.

The access point may be configured to generate a set of credentials for the device being enrolled. At step 330, the WPS registration component may encapsulate the credentials (or send the credentials to another process on the access point configured to encapsulate the credentials) in a higher layer protocol message and transmit them to the client device being enrolled over the limited access network.

At step 335, once the registration process is complete, the now enrolled device may join the secure wireless network exposed by the access point using the credentials supplied to the WPS client application over the limited access network.

Figure 4:
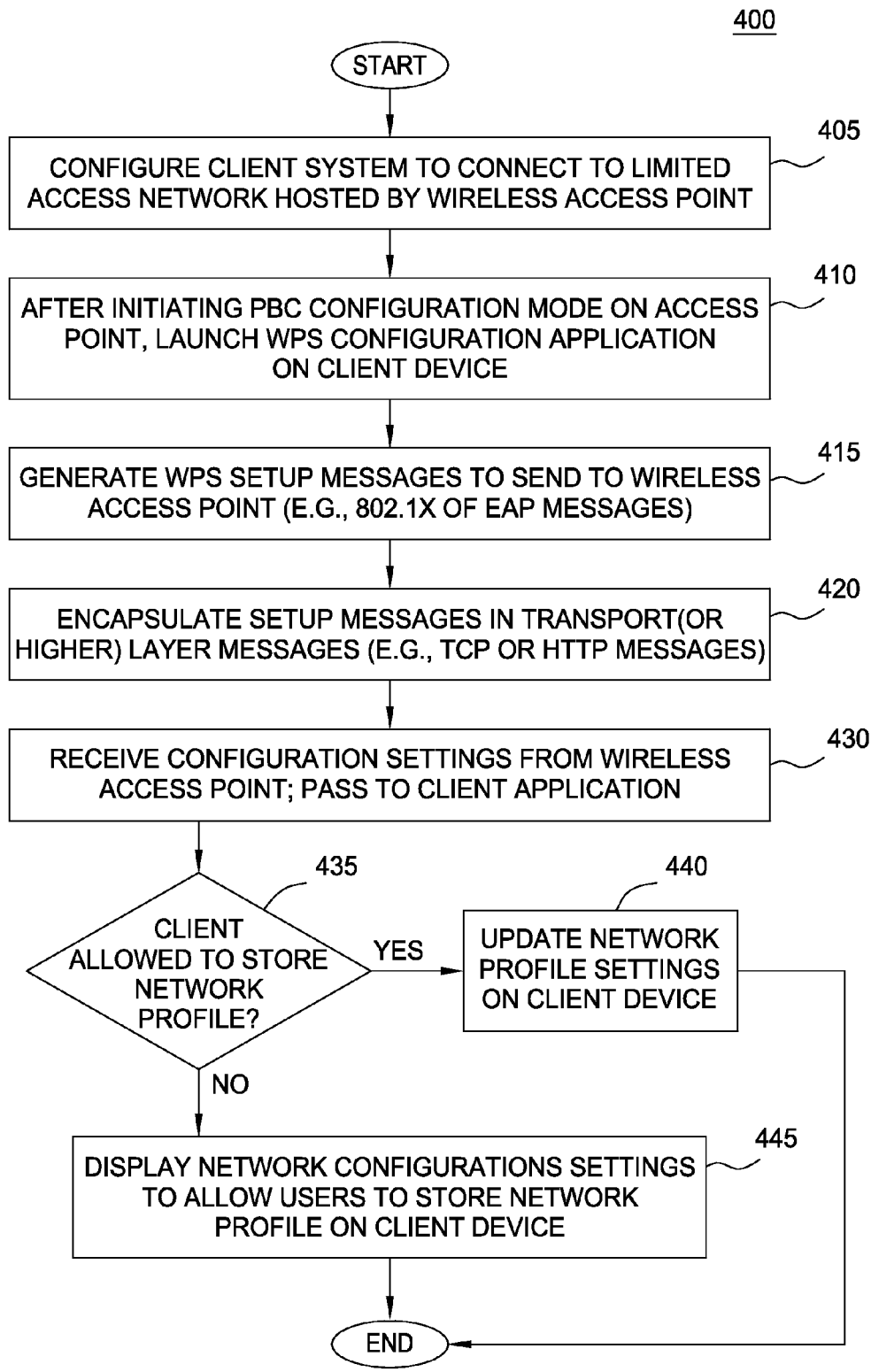
FIG. 4 illustrates a method for a client application to perform a WPS configuration session using a TCP-based connection, according to one embodiment presented in this disclosure.

FIG. 4 illustrates a method 400 for a client application to perform a WPS configuration session using a TCP-based connection, according to one embodiment presented in this disclosure. As shown, the method 400 begins at step 405 where a client device to be enrolled in a secure network joins a limited access network exposed by the wireless access point. As noted, such a network may be enabled after the user presses a PBC configuration button on the wireless access point.

Figure 5A:
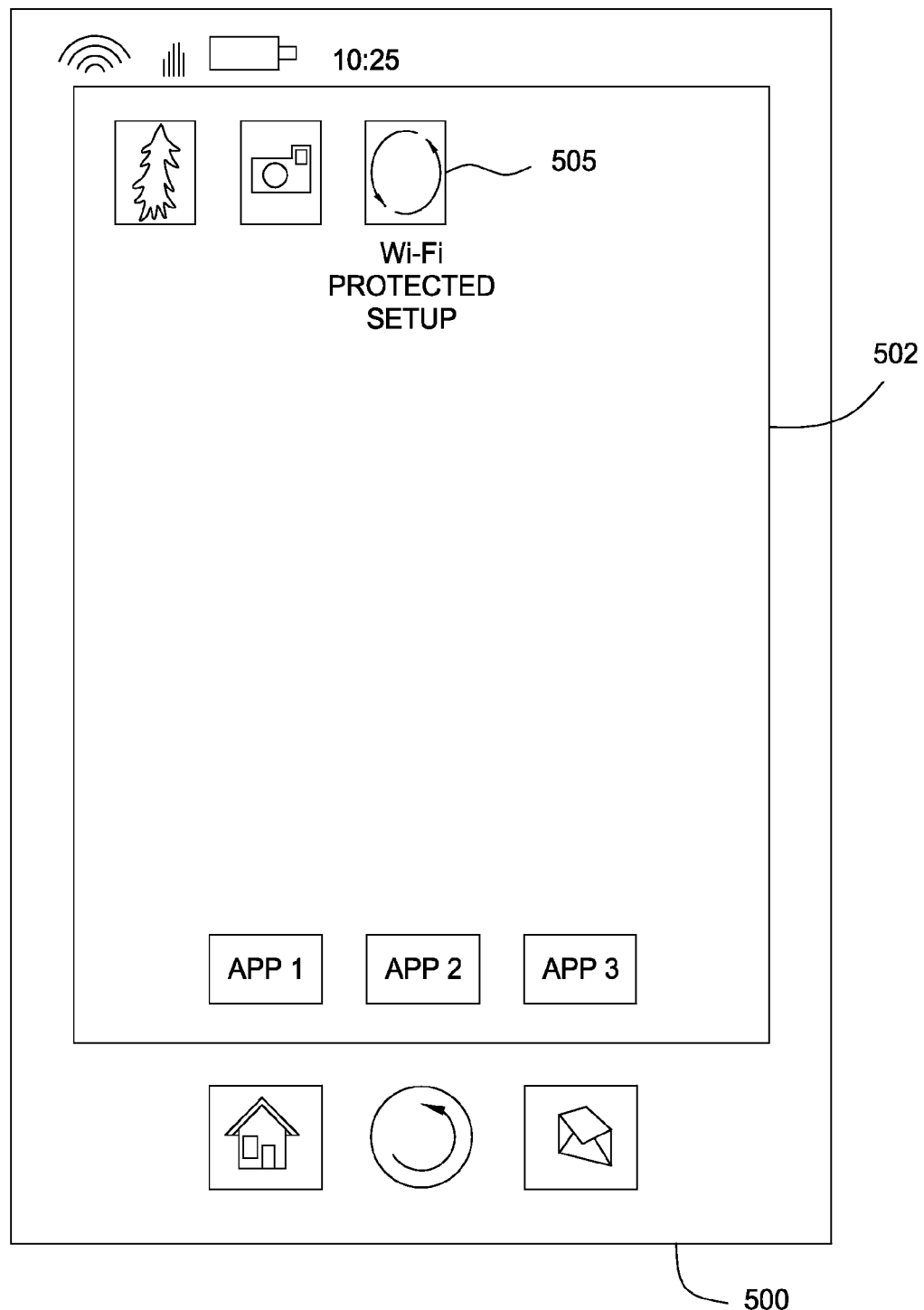
FIG. 5A-5B illustrate an example graphical interface of a client application configured to perform a WPS configuration session using a TCP-based connection, according to one embodiment presented in this disclosure.
Figure 5B:
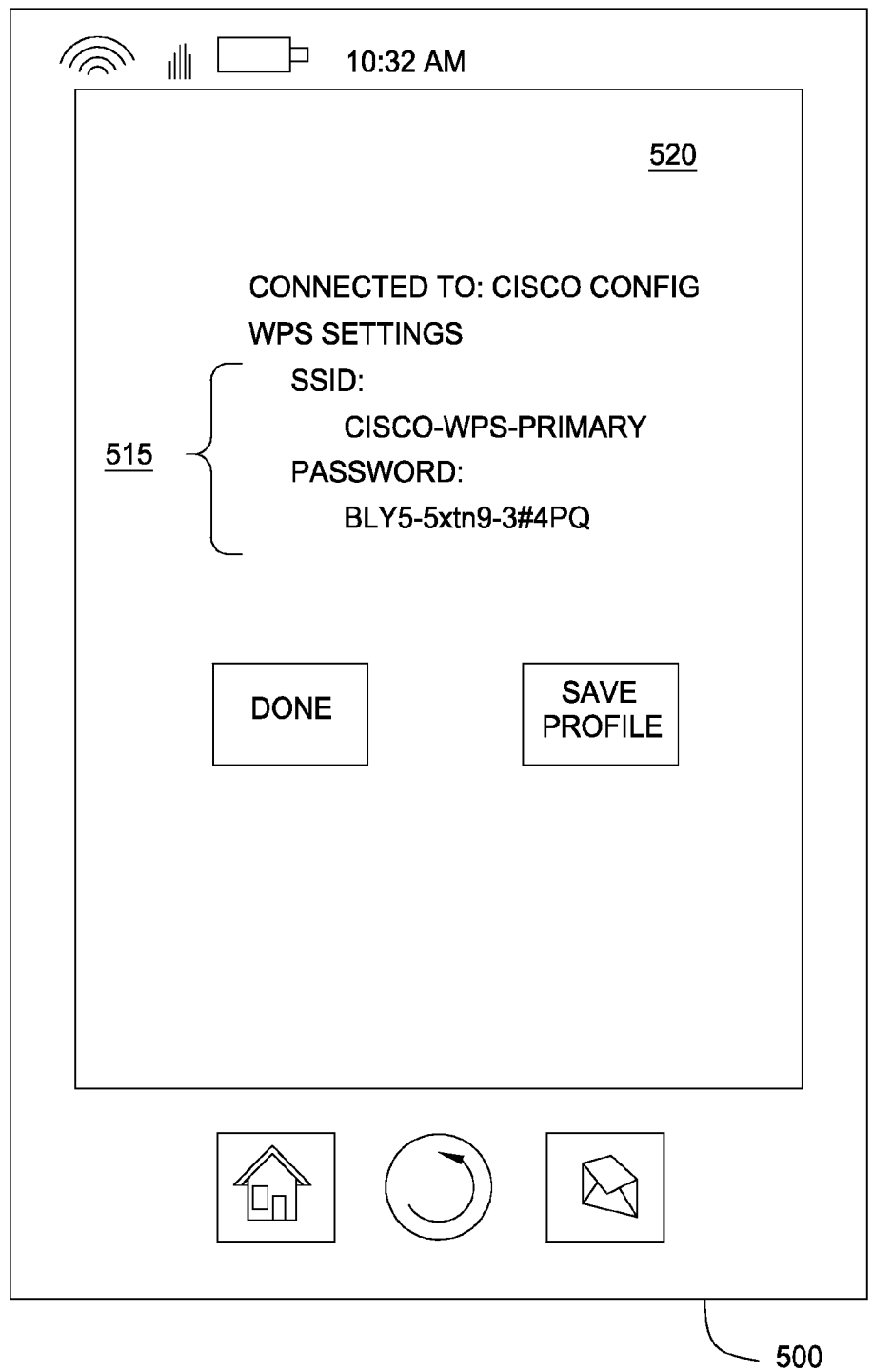

At step 410, once initiated, the user launches the client application on the access point. For example, FIG. 5A, illustrates an example graphical interface of a client application. As shown, a computing tablet 500 includes a touch sensitive screen 502 displaying a plurality of icons. In order for the computing tablet 500 to join a secure network a user can launch the setup application by tapping the icon 505. Referring again to method 400, at step 415, the application generates a set of one or more messages according to the configuration protocol (e.g., WPS messages generated according to EAP). At step 420, the setup application encapsulates the setup messages in a transport (or higher layer) protocol. For example, the setup application may establish a TCP connection using a port value specified for the configuration process and wrap the setup messages in TCP (or higher level) messages forwarded over the limited access network. Messages sent to the TCP/IP address and port combination may be forwarded to the WPS registration component on the server.

At step 430, the setup application receives credentials used to join a secure network exposed by the access point. For example the setup application may receive an SSID and password value for the secure network. At step 435, if the client application is allowed to update or store a network profile, then at step 440, the setup application updates (or creates) a network profile on the client device corresponding to the secure network. Again, wrapping messages in the higher layer protocol avoids requiring that the setup application communicate using the setup protocols of the WiFi protected setup process directly (e.g., EAP messages). Once stored, the client device may disconnect from the limited access network and join the secure network hosted by the access point. In such a case, the client device accesses. Otherwise, at step 445, the setup application displays the network configurations' settings used to access the secure network. In such a case, the user may manually configure a network profile to access the secure network hosted by the access point.

For example, 5B illustrates an example graphical interface the setup application after it has received configuration data, according to one embodiment. As shown, a display 520 on the computing tablet 500 provides a user with information used to join a secure wireless network. As shown the display 520 includes configuration data—an SSID and password. Once provided, the user may access a network configuration application provided by the tablet 500 to enter the configuration data in a network profile.

Advantageously, embodiments described above provide techniques for a client application on a computing device to perform a configuration process with a wireless access point. In one embodiment, the access point exposes an isolated, unsecured Access Point which provides access to the DHCP services and services by which a client application can run the WPS registration process over a TCP (or higher layer protocol) connection.

Doing so allows the WPS registration process to be performed over any TCP-based protocol instead of requiring that the client device provide access to 802.1x, or other low level services directly. Computing platforms (including desktops, laptops, tablets, mobile "smartphones," and even game consoles, network enabled DVD players and video streaming devices) frequently support and expose TCP-based APIs (such as sockets) to application programmers and even libraries and APIs for many TCP-based protocols (such as HTTP, SOAP and UPnP). Using these platform-supplied facilities, a WPS-based client application can easily be implemented on these platforms. Because these same computing platforms frequently do not expose 802.1x APIs to application programmers, a client enrollment application—i.e., a push button configuration applications using the WPS protocol, would otherwise be difficult or impossible to implement on those platforms.

As will be appreciated by one skilled in the art, embodiments presented in this disclosure may be implemented as a system, method or computer program product. Accordingly, embodiments presented herein may be implemented as an entirely hardware embodiment, as an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments may be devised without departing from the basic scope thereof. In view of the foregoing, the scope of the present disclosure is determined by the claims that follow.

We claim:

1. A method, comprising:
    exposing, on a wireless access point, a first wireless network used to configure client devices to access a second wireless network configured on the wireless access point;
    establishing a network connection with a client application on a client device over the first wireless network;
    receiving, over the network connection, by the wireless access point, one or more network messages generated by the client application; and
    sending, over the network connection, to the client application, a set of credentials used to join the second wireless network.

2. The method of claim 1, further comprising:
    receiving, from the client device, a request to join the second wireless network, wherein the request includes the set of credentials; and
    establishing a wireless network connection between the client device and the second wireless network.

3. The method of claim 2, wherein the set of credentials includes a service set identifier (SSID) and a network password.

4. The method of claim 1, wherein the network connection is a TCP connection.

5. The method of claim 1, wherein the one or more network messages encapsulate Extensible Authentication Protocol (EAP) messages passed to a setup application on the wireless access point.

6. The method of claim 1, wherein the first wireless network is enabled in response to a user pressing a button on the wireless access point.

7. The method of claim 1, wherein the first wireless network is enabled in response to a user pressing a button on a graphical user interface of a management interface on the wireless access point.

8. The method of claim 1, wherein the first wireless network is enabled in response to a user entering a PIN number in a graphical user interface of a management interface on the wireless access point.

9. A computer-readable storage medium storing code for execution by a processor on a wireless access point, wherein the code, when executed by the processor, performs an operation, comprising:
    exposing, on the wireless access point, a first wireless network used to configure client devices to access a second wireless network configured on the wireless access point;
    establishing a network connection with a client application on a client device over the first wireless network;
    receiving, over the network connection, by the wireless access point, one or more network messages generated by the client application; and
    sending, over the network connection, to the client application, a set of credentials used to join the second wireless network.

10. The computer-readable storage medium of claim 9, wherein the operation further comprises:
    receiving, from the client device, a request to join the second wireless network, wherein the request includes the set of credentials; and
    establishing a wireless network connection between the client device and the second wireless network.

11. The computer-readable storage medium of claim 10, wherein the set of credentials includes a service set identifier (SSID) and a network password.

12. The computer-readable storage medium of claim 9, wherein the network connection is a TCP connection.

13. The computer-readable storage medium of claim 9, wherein the one or more network messages encapsulate Extensible Authentication Protocol (EAP) messages passed to a setup application on the wireless access point.

14. The computer-readable storage medium of claim 9, wherein the first wireless network is enabled in response to a user pressing a button on the wireless access point.

15. The computer-readable storage medium of claim 9, wherein the first wireless network is enabled in response to a user pressing a button on a graphical user interface of a management interface on the wireless access point.

16. The computer-readable storage medium of claim 9, wherein the first wireless network is enabled in response to a user entering a PIN number in a graphical user interface of a management interface on the wireless access point.

17. An apparatus, comprising:
a processor; and
a memory storing executable instructions which, when executed on the processor, perform an operation, comprising:
exposing, on the wireless access point, a first wireless network used to configure client devices to access a second wireless network configured on the wireless access point,
establishing a network connection with a client application on a client device over the first wireless network,
receiving, over the network connection, by the wireless access point, one or more network messages generated by the client application, and
sending, over the network connection, to the client application, a set of credentials used to join the second wireless network.

18. The apparatus of claim 17, wherein the operation further comprises:
receiving, from the client device, a request to join the second wireless network, wherein the request includes the set of credentials; and
establishing a wireless network connection between the client device and the second wireless network.

19. The apparatus of claim 18, wherein the set of credentials includes a service set identifier (SSID) and a network password.

20. The apparatus of claim 17, wherein the network connection is a TCP connection.

21. The apparatus of claim 17, wherein the one or more network messages encapsulate Extensible Authentication Protocol (EAP) messages passed to a setup application on the wireless access point.

22. The apparatus of claim 17, wherein the first wireless network is enabled in response to a user pressing a button on the wireless access point.

23. The apparatus of claim 17, wherein the first wireless network is enabled in response to a user pressing a button on a graphical user interface of a management interface on the wireless access point.

24. The apparatus of claim 17, wherein the first wireless network is enabled in response to a user entering a PIN number in a graphical user interface of a management interface on the wireless access point.

* * * * *